(12) United States Patent
Maeda et al.

(10) Patent No.: US 6,481,559 B1
(45) Date of Patent: Nov. 19, 2002

(54) TRANSFER AND SORTING CONVEYOR

(75) Inventors: Hiromu Maeda, Shizuoka (JP); Kazuo Haraguchi, Shizuoka (JP)

(73) Assignees: Hiromu Maeda, Shizuoka (JP); Kabushiki Kaisha Kajitsu Hihakai Hinshitsu Kenkyujo, Shizuoka (JP)

( * ) Notice: Subject to any disclaimer, the term of this patent is extended or adjusted under 35 U.S.C. 154(b) by 0 days.

(21) Appl. No.: 09/762,350

(22) PCT Filed: Jul. 27, 1999

(86) PCT No.: PCT/JP99/04012

§ 371 (c)(1),
(2), (4) Date: Feb. 5, 2001

(87) PCT Pub. No.: WO00/07913

PCT Pub. Date: Feb. 17, 2000

(30) Foreign Application Priority Data

Aug. 3, 1998 (JP) .......................................... 10-251754

(51) Int. Cl.⁷ .............................................. B65G 47/68
(52) U.S. Cl. .................. 198/370.02; 198/440; 198/890
(58) Field of Search ............................ 198/890, 370.02, 198/440

(56) References Cited

U.S. PATENT DOCUMENTS

| | | | |
|---|---|---|---|
| 3,735,867 A | * 5/1973 | Vanderhoof et al. | 209/82 |
| 4,711,341 A | * 12/1987 | Yu et al. | 198/372 |
| 4,760,908 A | * 8/1988 | Houghton | 198/365 |
| 5,027,939 A | * 7/1991 | Kilper et al. | 198/365 |
| 5,038,912 A | * 8/1991 | Cotter | 198/370 |
| 5,165,515 A | * 11/1992 | Nitschke et al. | 198/349.95 |
| 5,167,315 A | * 12/1992 | Doane | 198/362 |
| 5,191,959 A | 3/1993 | Leemkuil | 198/365 |
| 5,230,417 A | * 7/1993 | Sato et al. | 198/365 |
| 5,275,273 A | * 1/1994 | Veit et al. | 198/370 |
| 5,613,591 A | * 3/1997 | Heit et al. | 198/370.02 |
| 5,657,858 A | * 8/1997 | Van Den Goor | 198/890 |
| 5,732,814 A | * 3/1998 | Owczarzak et al. | 198/890 |
| 5,927,465 A | * 7/1999 | Shearer, Jr. | 198/370.02 |

FOREIGN PATENT DOCUMENTS

WO    WO 98/15481    4/1998

* cited by examiner

*Primary Examiner*—Douglas Hess
(74) *Attorney, Agent, or Firm*—Reed Smith LLP

(57) ABSTRACT

A transport-sort conveyor in which a pin of the sliding block of the sort conveyor traveling at high velocity does not cause any trouble at the sorting point and which is suitable for sorting small sized articles is provided. A pusher is provided on any one of the mounting member on one side of the bearing surface defining member and the sliding block to urge the sliding block in the sorting direction while being engaged on one side, and release engagement of the sliding block to be used for sorting operation by the actuating device in the upstream of the sorting point to move the sliding block sideways from the straight-ahead path toward the sorting path. The sliding block that has changed its direction is carried and guided by the sorting guide rail extending from the sorting point in the sorting direction, and thus no movable device such as switch rail or the like is provided at the sorting point. A plurality of bearing surface defining member is provided for a pair of left and right mounting member, and a sliding block is provided for each bearing surface defining member so that small sized article can be sorted.

13 Claims, 7 Drawing Sheets

TRANSFER AND SORTING CONVEYOR

This application in a National Phase of PCT/JP99/04012 filed Jul. 27, 1999 and which claims the Paris Convention priority of the Japanese Application of Hei 10-251754 filed Aug. 3, 1998, the complete disclosure of which are hereby incorporated by reference.

1. Technical Field

The present invention relates to a transport-sort conveyor for sorting objects conveyed in a single file from a previous process step into a plurality of prescribed positions according to the object at some midpoint of transfer.

2. Background Art

Conventionally, a sort conveyor comprising a sliding block for pushing out articles sideways (to the side) onto a slat or a pipe roll that defines a conveying surface as a means for sorting articles on the conveying surface by providing sideward movement thereto, the sliding block having a guide pin projecting downwardly from the sliding block and a guide roller rotatably mounted thereto, wherein the articles are moved to specified positions (rows) or moved out sideward from the conveyor by lateral sliding movement of the sliding block along the slat or the pipe roll while being guided along the guide groove that allows the guide pin or the guide roller to move straight ahead and the sorting guide rail branched off said straight-ahead guide groove, as shown in Japanese Patent Publication No. 8-615, has been used.

Then, a switching guide rail (switching rail) is provided at a switching point of sorting (branch point) so that the guide pin of the sliding block is selectively guided into the straight ahead direction and the sorting direction by the operation of the switching guide rail. In such a switching mechanism, the switching operation is required when the pin of the sliding block passes over the switching point, and a slight time lag occurs due to elongation of the chain or the like. Therefore, there have been troubles such that the guide pins of the sliding block collide with a branch point between the straight-ahead direction and the sorting direction in the groove due to an insufficient sorting movement of the switching rail, and consequently, the pin is damaged or stopped by overrunning out of the groove. Therefore, attempt has been made to provide a spring at the position to which the pin collides to absorb shock, or to form a bevel to allow the pin to slide into any directions. However, the causes of the troubles have not been eliminated.

Since the conventional transport-sort conveyor as described above is provided at the switching point with a switching guide rail that diverts the pin projecting downward from the sliding block, in the case of the transport-sort conveyor for medium and small sized articles, of which the width of the bearing surface defining member such as a slat that defines the bearing surface is relatively small in the direction of travel, the interval between the pins of the front and rear sliding blocks is small, and thus when the speed of the conveyor is high, the switching mechanism cannot follow and the collision occurs as described above.

In addition, the length of the switching guide rail or the period of time required for performing the switching action limits the speed of the conveyor, thereby hindering the conveyor from increasing the speed. Especially, it has a disadvantage in that the length of the guide groove formed on the switching guide rail cannot be shortened due to the allowable diverting angle for smoothly introducing the pin of the sliding block advancing straight ahead from the upstream into the lateral sorting guide groove provided out of the straight-ahead path at the downstream end. In other words, there is a problem in that the interval distance between the sliding blocks cannot be shortened due to the required length for the switch rail.

In addition, since the switch mechanism is mounted on under the bearing surface of the frame, when a time lag occurrs between the sliding block and a sorting signal for the switching mechanism in association with elongation of the chain after long period of use, inspection or adjustment cannot be made easily.

Having resolved these problems, Japanese Patent Application No. 9-271872 was filed on Aug. 28th, 1997 for the present invention directed to a transport-sort conveyor suitable for a high-speed transfer sorting of the small sized articles. The object of the present invention is to provide a conveyor of further improved construction that can transfer and sort the smaller sized articles.

DISCLOSURE OF INVENTION

In order to achieve the object described above, the characteristics of the present invention are stated in the appended claims.

The invention comprises a transport-sort conveyor comprising a plurality of bearing surface defining members arranged in parallel, said bearing surface defining members being mounted at both ends on a conveyor chain endlessly rotating on a chain rail disposed on both left and right side, said bearing surface defining members being provided with a sliding block movable in the direction parallel with the bearing surface defining members, said sliding block having a pin projecting downward for being guided sideways from the sorting point along the guide rail so that the article on the bearing surface is sorted sideways, engaging means for engaging said sliding block to the conveyor on one side, said engaging means including an engaging strip and a holding portion on a part of a mounting member for mounting said bearing surface defining members onto said conveyor chain and on a part of said sliding block respectively, pusher means for urging said sliding block sideways in the sorting direction by a resilient member such as a spring provided on either one of said mounting member or said sliding block, an actuating device for releasing engagement between said engaging strip and a holding portion immediately before the upstream side of the sorting point, wherein said sliding block is urged by said pusher means in the sorting direction and moved sideways when the engagement between said engaging strip and a holding portion is released by said actuating device for allowing said guide pin projecting downward or a guide roller to travel toward the sorting path so that the sliding block is guided by the sorting guide rail provided from the sorting point in the sorting direction and moved sideways toward the discharging port.

The invention according to another embodiment is a transport-sort conveyor wherein a plurality of bearing surface defining members are provided on a pair of left and right mounting members, and a plurality of pusher means and engaging means corresponding to each mounting member and each sliding block are provided to make the mounting intervals of the sliding blocks shorter than the pitch of the chain link so that small sized articles can be sorted.

In another embodiment is a transport-sort conveyor further comprising an upper roller and an lower roller rotating while clamping the upper surface and the lower surface of the bearing surface defining member so that said sliding block moves smoothly in lateral direction by rotation of said rollers.

In another embodiment is a transport-sort conveyor wherein said engaging means comprises an engaging strip provided on said mounting member and a holding portion provided on said sliding block.

In another embodiment is a transport-sort conveyor wherein a pusher for urging said sliding block toward the sorting path is provided on a part of said mounting member.

In the invention each sliding block of the transport-sort conveyor is engaged with a mounting member on one side and the guide pin projecting downward or the guide roller travels along the straight-ahead path. When the bearing surface defining member having articles to be sorted thereon approaches to the sorting section and the sliding block reaches to the position immediately before the upstream side of the sorting point, the actuating device is actuated and releases the engagement between said sliding block and the mounting member, and the sliding block moves sideways toward the sorting path by being urged by the pusher means to travel along the sorting path. Since there is no obstruction such as a switching rail that limits the movement of the guide pin or the guide roller in the area where the guide pin or the guide roller moves away from the straight-ahead path toward the sorting path, the guide pin or the guide roller is positively and smoothly shifted to the sorting path immediately before the sorting point.

The actuating device actuates in accordance with the length of the article to be sorted in the direction of travel, and releases the sliding blocks corresponding to the side surface of the article from the leading edge to the trailing edge (sliding blocks translating together with the article) from engagement with each mounting member consecutively so as to move sideways from the straight-ahead path to the sorting path. The guide pin or the guide roller of the sliding block moved sideways toward the sorting path is guided by the sorting guide rail provided form the sorting point in the sorting direction to move the sliding bock sideways in the sorting direction in which a diverging conveyor Y is provided. The article loaded thereon is pushed sideways by the sliding block moving sideways and discharged toward the diverging conveyor Y to be sorted.

In another embodiment each sliding block of a plurality of bearing surface defining members provided on a pair of mounting member is independently engaged with the mounting member, and therefore, the dimension in the direction of travel of the mounting member calculated from the size of the chain link of the conveyor chain, that is, the mounting interval of the bearing surface defining member may be reduced to the length as short as a finger by dividing the same into a plurality of sections.

Therefore, it is suitable for the small sized sort conveyor for small sized articles that are desired to be sorted at small intervals about a length of a finger. On the other hand, even when a larger conveyor chain is used, the transport-sort conveyor in which a plurality of bearing surface defining member are arranged at a small intervals to a pair of mounting member can sort from large sized articles to small sized articles.

In addition, since the intervals of sliding blocks (mounting pitch) may be reduced, the sliding blocks corresponding to the length of the article from the leading edge to the trailing edge can be actuated for the sorting operation, sorting operation can be carried out without providing excessive space in front and behind the articles to be sorted. In other words, the article can be positively sorted even when they are not supplied and conveyed at regular intervals, but at random intervals.

In another embodiment since each sliding block is moved sideways while clamping the upper and lower surfaces of the bearing surface defining members by rollers constituted as door rollers, the pin projecting downward or the guide roller may be moved sideways smoothly without any strain when being guided by the sorting guide rail.

In another embodiment since the engaging strip and a pusher are provided on one of the mounting members fixed on the conveyor chain, the engaging strip and the pusher always travels stably so that the actuating device provided on the frame on the side of the conveyor ensures a release of engagement, thereby enabling a high speed operation.

BEST MODE FOR CARRYING OUT THE INVENTION

Figure 1:
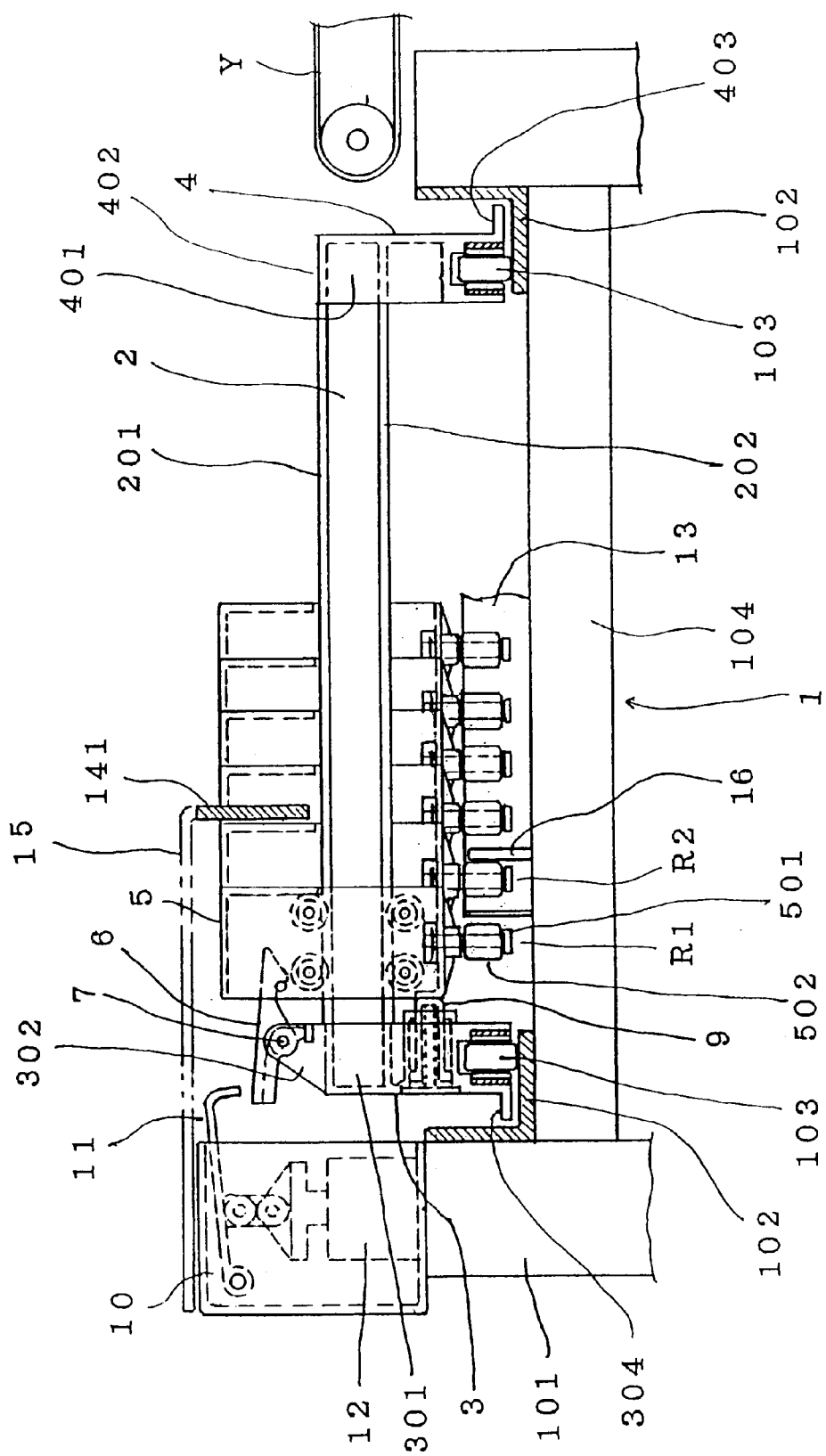
FIG. 1 is a front schematic diagram in cross section of the principal portion showing the general structure of the sort conveyor of the embodiment of the present invention.

The transport-sort conveyor of the present invention comprises engaging means including a engaging strip and a holding portion at a part of the mounting member on one side for mounting a bearing surface defining member to the conveyor chain on the left and right sides and at a part of the sliding block that moves sideways along the bearing surface defining member for engaging the sliding block with one side of the conveyor respectively. In normal condition (when no sorting operation is carried out), it travels with the sliding block engaged on one side.

On either one of sliding block and the mounting member engaged by said engaging means, a pusher for moving the sliding block by a prescribed distance in the sorting direction (to the side of the sorting path) abruptly (so as to reject instantaneously), when engagement is released by the actuating device or some other means.

The pusher means may be provided on the sliding block, or on the mounting member that runs while being fixed to the chain. It is preferable to provide it on the mounting member because the traveling position is stable.

Though the bearing surface defining member and the sliding block described above may be provided one each for a pair of left and right mounting member, for example, a plurality of bearing surface defining member and their mating sliding blocks are aligned along the direction of travel for a pair of mounting members according to the size of the conveyor chain, and the mating engaging means and pusher means are provided respectively for each of them.

For example, providing three or more bearing surface defining members for a pair of mounting member every two links of chain so that the short intervals of sorting pitch shorter than the pitch of the conveyor chain link L is obtained is effective for sorting articles conveyed at dense intervals.

The sliding block described above is provided with a rolling roller on the surface that contacts with the bearing surface defining member and movably combined in the horizontal direction (in the direction of the width of the conveyor) with respect to the bearing surface defining member so that it moves smoothly by the rolling roller, and with a guide pin projecting downward or guide roller on the center of the lower portion.

When the engagement of said engaging means is released by the actuating device provided at a prescribed position on the upstream side immediately before the sorting point, the pusher means resiliently moves the sliding block sideways toward the sorting path at a prescribed distance equal to or longer than the diameter of the guide pin or the guide roller away.

At the sorting point in the straight-ahead path where the guide pin or the guide roller that travels straight-ahead while engaged with one side, no obstruction such as the straight-ahead guide rail or the direction switching rail, and a sorting guide rail is provided with the tip portion placed on the side of the sorting side of the straight-ahead path.

The sliding block released from engagement immediately before the sorting point moves the guide pin or the guide roller sideways from the straight-ahead path toward the sorting path and is tripped off by the tip of the guide rail to push the articles to be sorted toward the diverging conveyor on the sideway along the guide rail.

Embodiment

Figure 2:
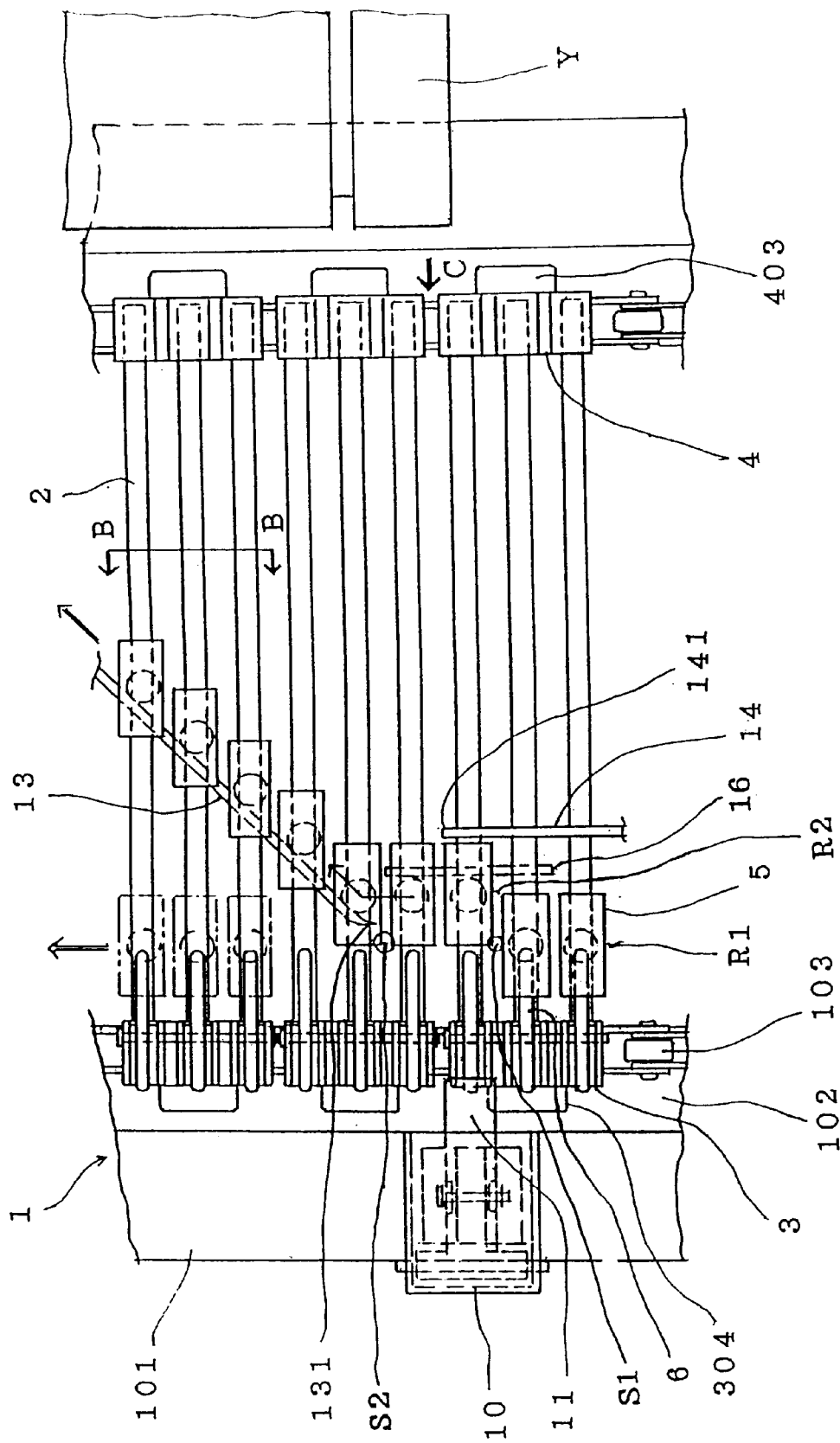
FIG. 2 is a plan view viewed from the portion of FIG. 1.

Referring now to the drawings, an embodiment of the present invention will be described. FIG. 1 is an explanatory cross sectional view of the principal portion of the sort conveyor, and FIG. 2 is an explanatory plan view of the principal portion of the same, and FIG. 3 to FIG. 8 show the same in detail.

As shown in the drawings, in the conveyor 1, conveyor chains 103 are endlessly stretched taut on chain rails 102 disposed on both inner sides of the frame 101, and bearing surface defining members are arranged in parallel between the conveyor chains 103 with the both ends fixed to the chains 103 on both sides by the use of a mounting member 3 on one side and a mounting member 4 on the other side respectively.

Each bearing surface defining member 2 is provided with sliding blocks 5 so as to be movable along the length (in other words, in the direction of the width of the conveyor) mounted thereon in combination.

The sliding block 5 is provided with a guide pin 501 projecting downward in the center of the lower portion thereof for guiding the sorting operation. Thought it is preferable to provide a guide roller that serves to reduce the contact friction with the sorting guide rail 13 described later on the guide pin 501, in the case of the sort conveyor for light load, it is also possible to provide only a guide pin 501 without a guide roller.

Figure 7:
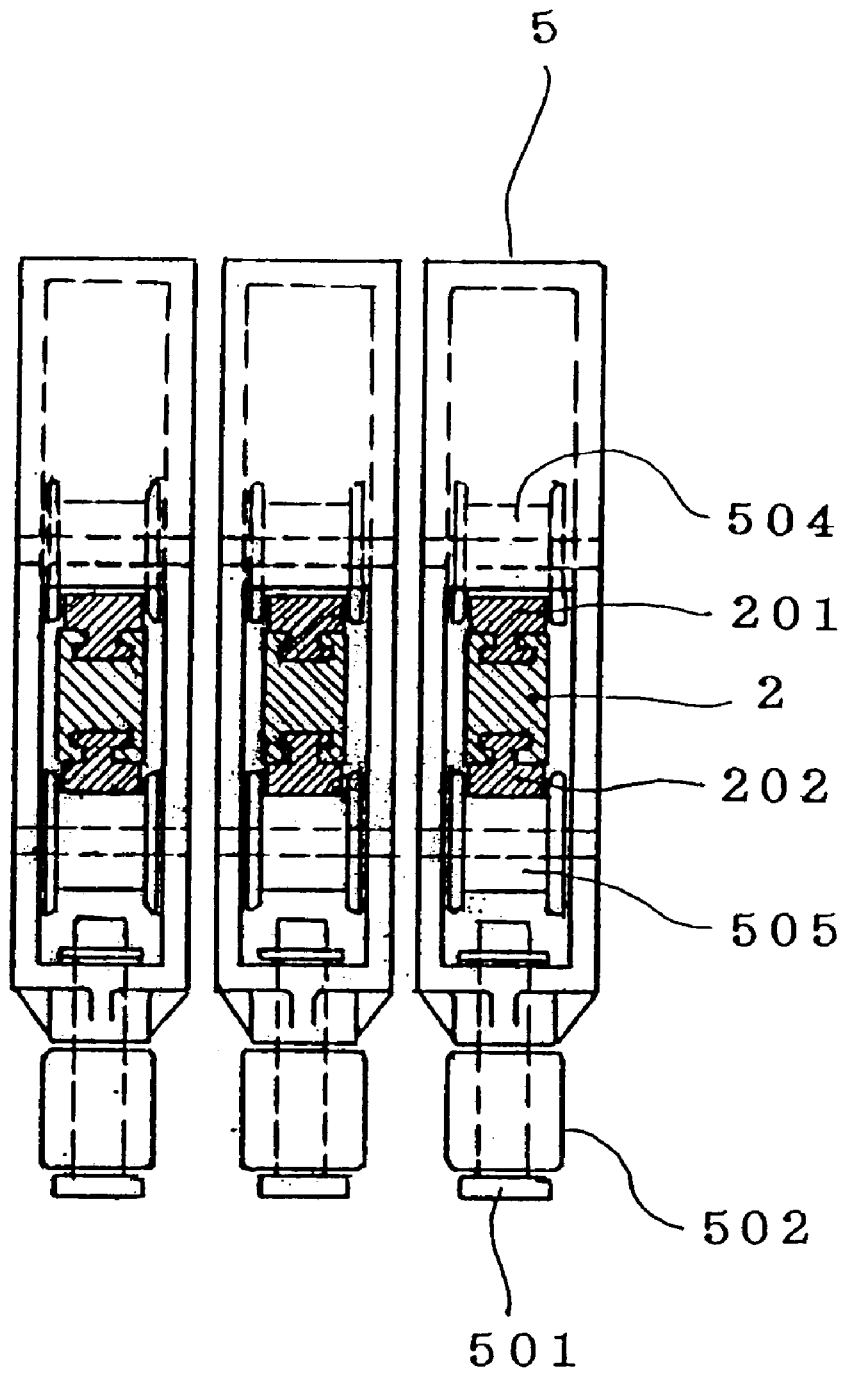
FIG. 7 is an explanatory cross section of the bearing surface defining member of the part shown by the line B—B of FIG. 2.

Though the bearing surface defining member 2 may be simply a slat material of any shape, it is preferable to use aluminium molding material or forming material as shown in FIG. 7, and to provide an upper and lower sliding members 201, 202 with a material having small frictional coefficient on the upper and lower surfaces so as to provide agile sideways movement of the sliding block 5.

On both ends of the bearing surface defining member 2 is assembled into the assembling portion 301, 401 formed on the mounting member 3 on one side (left side in FIG. 1 and FIG. 2) and the mounting member 4 on the other side (right side in FIG. 1 and FIG. 2) by means of various mounting means such as press-fit or fitting.

Figure 3:
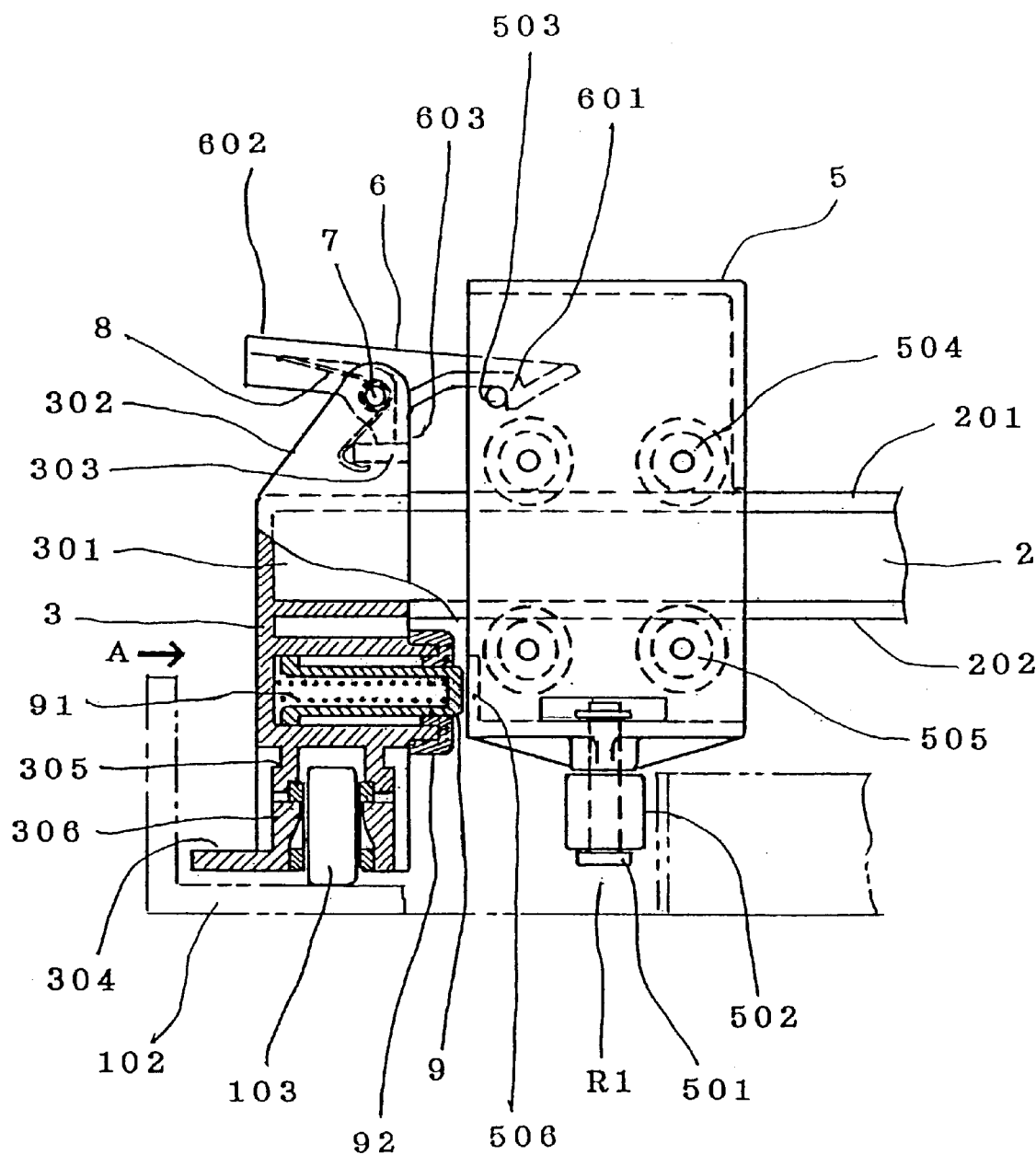
FIG. 3 is a front view partly in cross section showing a state in which the sliding block is engaged to the mounting member on one side of the sliding block.
Figure 5:
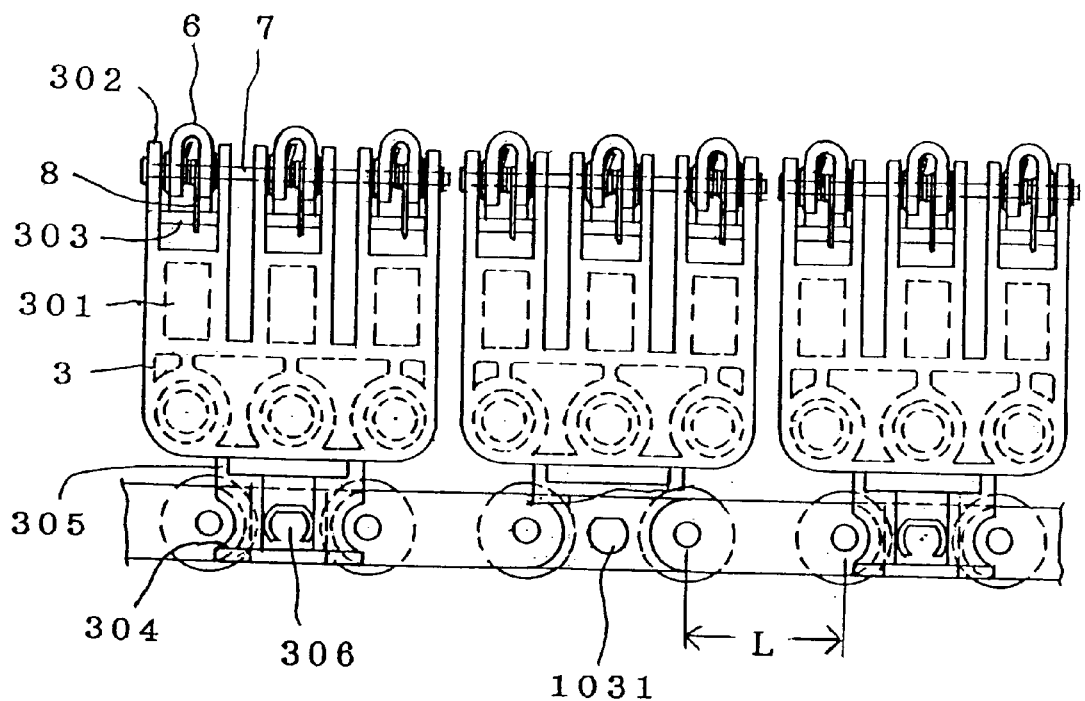
FIG. 5 is side view of a principal portion of the mounting member on one side shown in FIG. 3 viewed from the side of the arrow A.
Figure 6:
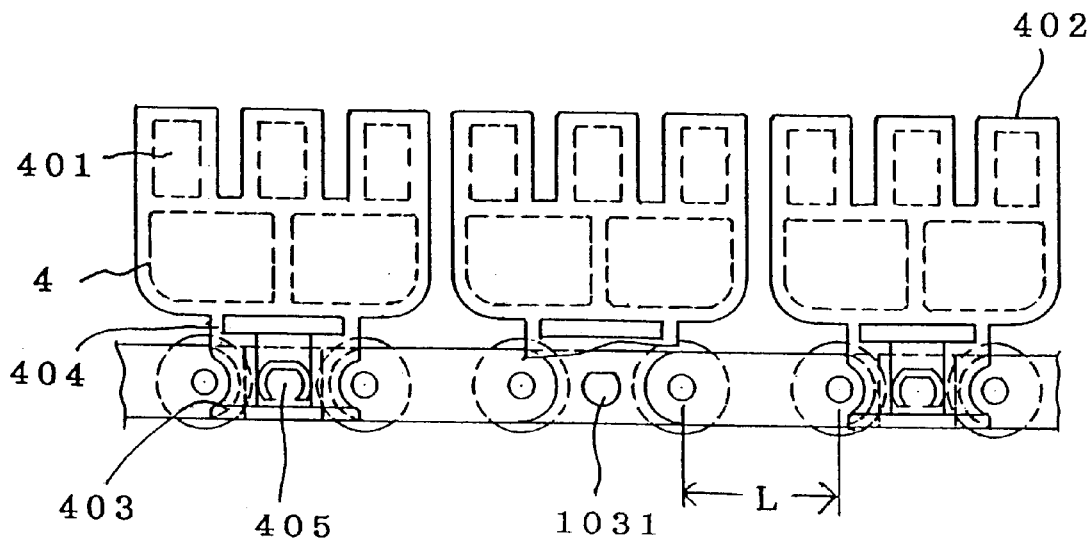
FIG. 6 is a side view of a principal portion of he mounting member on the other side shown in FIG. 2 viewed from the side of the arrow C.

The mounting member 3 on one side pivotally supports the engaging strip 6 by means of pivot pin 7 on the holder section 3 formed on the upper portion as shown in FIG. 3 and FIG. 5. The engaging strip 6 comprises a engaging portion 601 formed downwardly at the position extending from the fulcrum toward the sliding block 5, a touch portion 602 extending the other direction, and a detent portion 603 formed around the pivot pin 7 for limiting the rotation, and urged by the torsion spring 8 so that the engaging portion 601 described above is pressed against the holding portion 503 of the sliding block 5.

The engaging strip 6 may be of any shape as far as it can engage the sliding block 5 to one side (left side in FIG. 1, FIG. 2, FIG. 3, and FIG. 4).

The reference numeral 303 denotes an abutting portion formed on a part of the holder portion 302 for serving as a stopper of the detent portion 603 that is formed to keep the engaging strip 6 urged by the torsion spring 8 in a certain engaged posture.

On the other hand, the upper surface 402 of the mounting member 4 on the other side is flush with or slightly lower than the upper sliding member 201 of the bearing surface forming member 2 so that the articles P moved sideways by the sliding block 5 is pressed out from the conveyor to the side without being tripped over or caught and smoothly moved in sliding motion toward the diverging conveyor Y.

The mounting member 3 on one side and the mounting member 4 on the other side is combined by snapping snaps 306, 405 in the chain link hole 1031 formed on the leg portions 305, 404 extending downward so as to clamp both outsides of the chain 103. Various known mounting means may be used for the combined structure of the mounting member and the chain.

Figure 4:
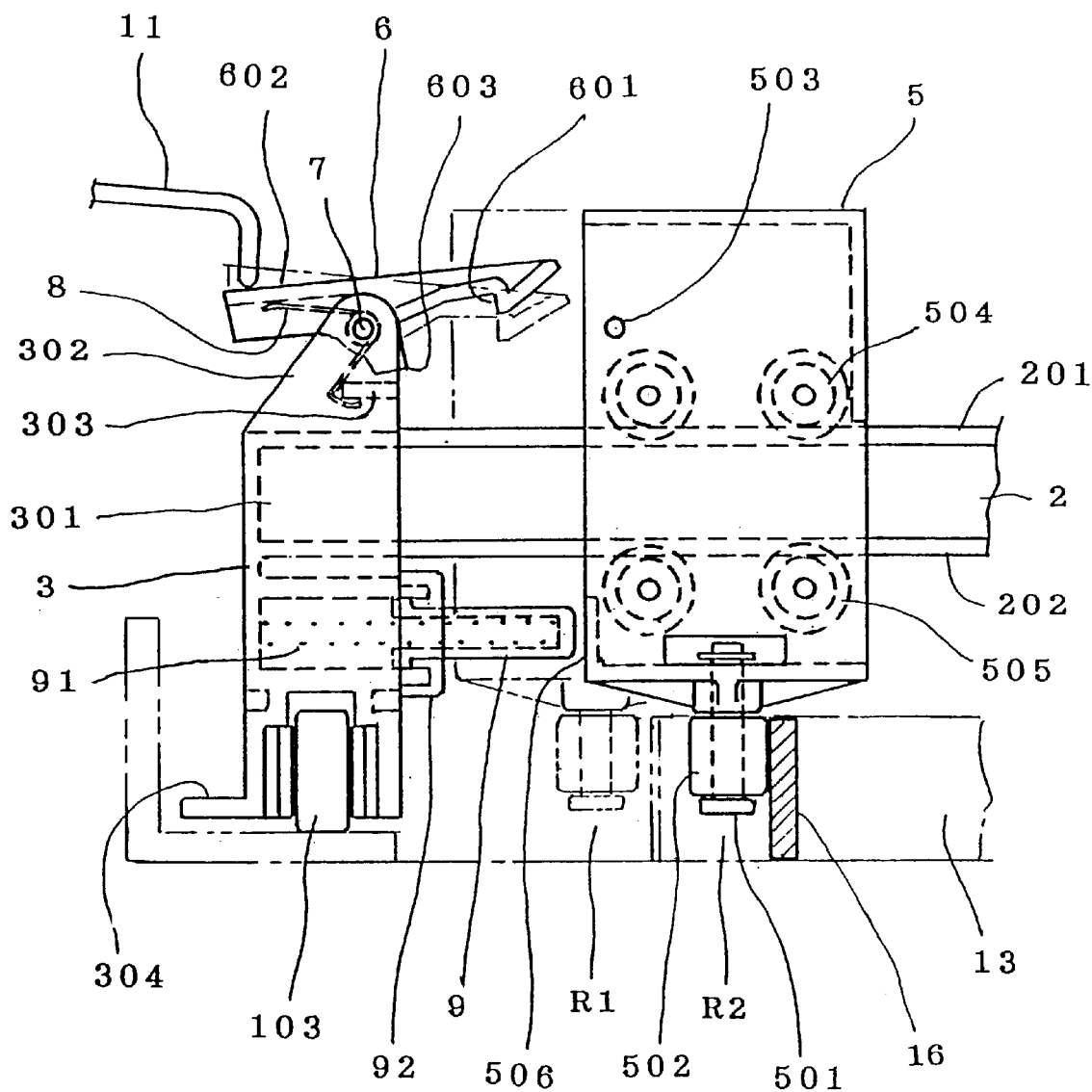
FIG. 4 is an explanatory drawing showing a state in which engagement of the sliding block of FIG. 3 is released from engagement and moved sideways to the sorting path.

The reference numeral 9 denotes a pusher of the pusher means mounted on a part of the mounting member 3 by means of a cap 92 by being urged by the spring 91 so as to project toward the sliding block 5. In other words, as shown in FIG. 3, when the engaging portion 601 of the engaging strip 6 is engaged with the holding portion 501 of the sliding block 5, the pusher 9 travels by being pressed by the side portion 506 of the sliding block 5 into the inside of the mounting member 3, and when the touch portion 602 of the engaging strip 6 is pressed down by the touch lever 11 of the actuating device 10 described later, the engaging strip 6 releases engagement with the sliding block 5 as shown in FIG. 4 so that the pusher 9 urged by the spring 91 resiliently (so as to reject instantaneously) moves the sliding block 5 sideways toward the sorting path R2.

The sliding block 5 is, as shown in FIG. 7, provided with the upper roller 504 and the lower roller 505 that move sideways while clamping the upper surface sliding member 201 and the lower surface sliding member 202 of the bearing surface defining member 2 in order to move smoothly.

The sliding block 5 moves straight ahead from the upstream side of the conveyor 1 to the position S1 immediately before the sorting section in the state being engaged with one side (left side in FIG. 1, FIG. 2, and FIG. 8) by the engaging strip 6, and the guide roller 501 and the guide roller 502 travel on the straight-ahead path R1.

Figure 8:
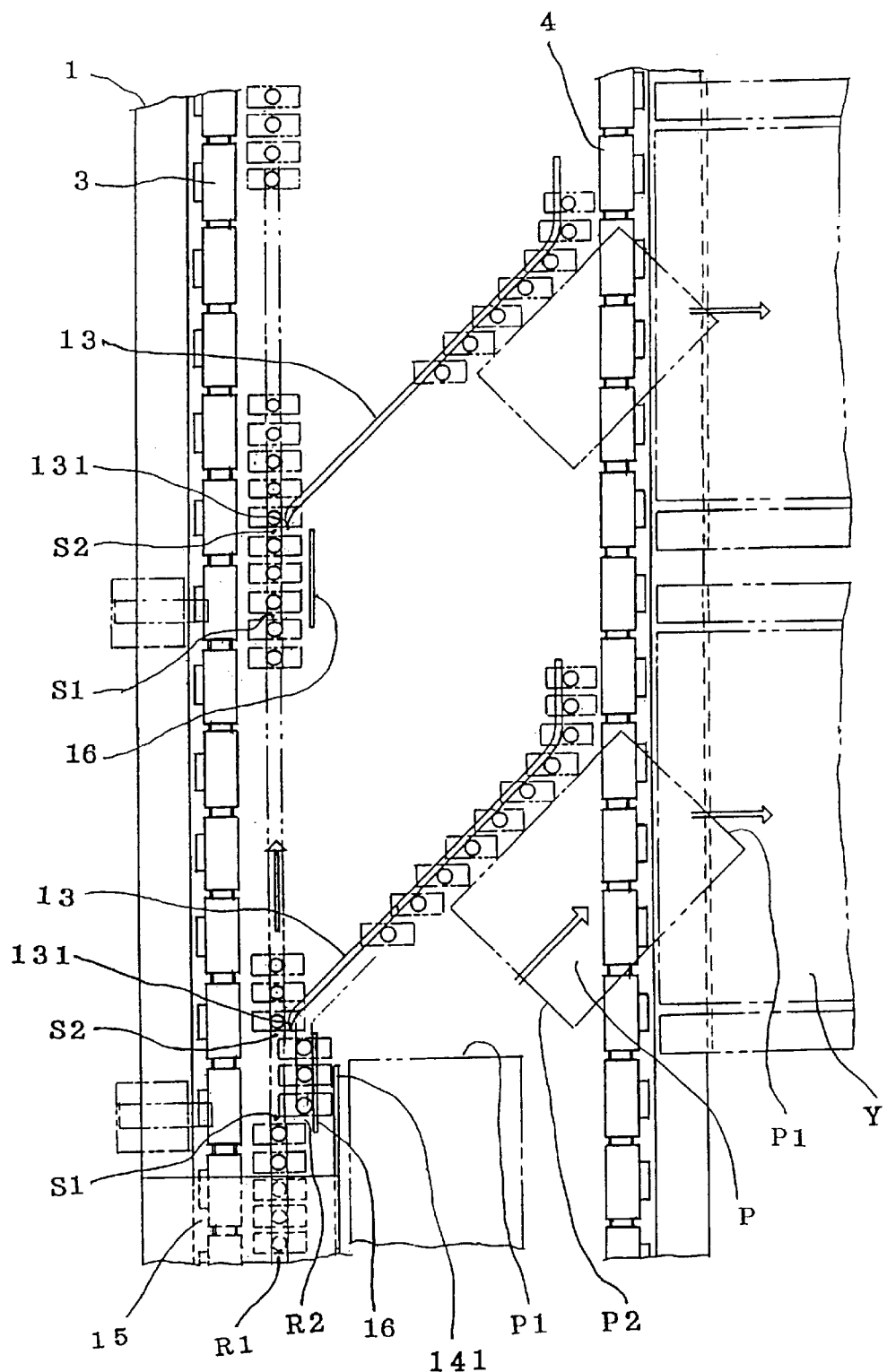
FIG. 8 is a general explanatory plan view of the sorting section of the present invention.

The reference numeral 10 is an actuating device provided on the sorting section, and as shown in FIG. 2 and FIG. 8, provided at a prescribed position on the upstream side of the sorting point S2, so as to move the touch lever 11 to abut against and actuate the touch portion 602 of the engaging strip 6 instantaneously at a high speed to release engagement between the engaging portion 601 and the holding portion 503 of the sliding block 5 at the position S1 immediately before the sorting point S2.

As a driving source, a stepping motor or other actuator may be used instead of the solenoid 12, and the actuating apparatus 10 may be other structure as far as it releases engagement between the engaging strip 6 and the sliding block 5. The actuating device 10 is actuated corresponding to the size (length in the direction of travel) of the article P from the leading edge P1 to the trailing edge P2 by sorting operation signals transmitted in synchronization with the article P from the sorting operation controller (not shown), and each engaging strip 6 is released from engagement with the sliding block 5 by the touch lever 11.

The sliding block 5 released from engagement at the position S1 immediately before the sorting point resiliently moves sideways from the straight-ahead passage R1 toward the sorting path R2 and reaches to the sorting point S2.

The sliding blocks 5 at the portion on which no article is placed or articles not to be sorted are placed moves straight ahead in the state of being engaged with the mounting member 3 on one side since the actuating device does not actuate.

The reference numeral 13 is a sorting guide rail for guiding the guide pin 501 or the guide roller 502 of the sliding block 5 that has been traveling on the side of the sorting path up to the sorting point S in the sorting direction (toward the right side of the conveyor 1).

The tip of the sorting guide rail 13 comes to position (where they do not collide) leaving the space for the path through which the guide pins 501 or the guide rollers 501 of the sliding blocks 5 that go straight ahead over the sorting point S2 travel, whereby they do not come into contact with the sliding blocks 5 that move straight ahead. It carries only the sliding blocks 5 that have been traveling through the sorting path R2 and guides them sideways. The sorting guide rail 13 is mounted on the lateral beam member 104 in the conveyor frame 101.

The article P is pushed by the sliding blocks 5 being moved sideways and is discharged toward the diverging conveyor Y to be sorted.

The sliding block 5 having discharged the article P to the diverging conveyor Y and moved sideways toward the mounting member 4 advances as is (right side in FIG. 8), then turns back from the end of the sort conveyor 1 downwardly and is moved toward the mounting member 3 on one side by the return guide rail (not shown) formed and mounted so as to move sideways in the opposite direction from the sorting guide rail 13 along the return side (return path), and then pushes the pusher 9 back by its side portion 506 so that the holding portion 501 on the upper portion pushes the engaging portion 601 of the engaging strip 6 up into click-engagement. In this way, the sliding blocks 5 are returned to the initial state in which they are engaged to the mounting members on one side by the engaging strips 6 back to the conveyor starting portion, then travel again on the straight-ahead path R1.

When the conveyor travels along the return side, it travels with the return-trip sliding portions 304, 403 projecting outward from the mounting member 3 on one side and from the mounting member 4 on the other side being received on the return rail (not shown) provided on the inner side of the lower portion of the conveyor frame.

The reference numeral 14 denotes a side rail for guiding transfer of the article P from the end of the upper stream to the first sorting of the sort conveyor 1 provided for establishing the space between the side of the article P and the sliding block for allowing the sliding block to move sideways in advance in the upstream of the sorting point S. In other words, in FIG. 2, the right side of the side rail 14 is a transfer area for the articles to be sorted, and the article P supplied from the previous process step is supplied to this transfer area.

The side rail 14 may be formed integrally with the side cover 15 for protecting the engaging strip engaging the sliding block 5 with the mounting member 3 on one side so as not to be disengaged (released) contrary to expectations due to inadvertent external action.

The end portion 141 of the side rail 14 also serves to stop an overrun of the sliding block 5 resiliently moving sideways toward the sorting path when the actuating device 10 for the first sorting operation releases engagement.

The reference numeral 16 denotes a sorting path guide rail abutting against the guide pin 501 or the guide roller 502 under the sliding block 5 released from engagement at the sorting section and pushed by the pusher 9, which defines the side wall of the sorting path R2 to the sorting point S2.

For assembly of the conveyor chain 103 and the mounting members 3 and 4, a known mounting mechanism including the chain attachment or the like may be used in addition to the embodiment shown in the figures.

While there is shown an example having three bearing surface defining members 2 mounted on the mounting members 3 and 4 every two links of the conveyor chain 103, any number of the bearing surface forming members 3 may be provided, that is, there may be more, and there may be less.

The engaging mechanism may be other mechanisms as far as it has such a structure that the sliding blocks 5 mounted to the bearing surface defining member 2 so as to be able to move sideways travels along the straight-ahead path stably in the state of being engaged with one side of the conveyor in the initial portion, and then releases engagement from one side by the actuating device immediately before the sorting point so as to make it freely removable.

The pusher means may be a lever or the like as a matter of course as far as it can resiliently move the sliding blocks 5 sideways (in jogging movement) from the straight-ahead path to the sorting path by being urged by a resilient member such as a spring when said engaging mechanism is released.

In this arrangement, since the sliding block 5 travels in the state being engaged with one side (left side) of the sort conveyor during straight-ahead movement, it never moves sideways even when vibration or inadvertent external action is applied, whereby the guide pin 501 projecting downward or the guide roller 502 travels stably along the straight-ahead path R1. Therefore, there is no need to provide any component such as the straight-ahead guide rail or the like that may be an obstacle below the bearing surface defining member 2 and thus the sort conveyor has an advantage in that it may be made in simple and safe structure.

Since the sorting section is provided only with a sorting guide rail 5 fixed thereon, and the sliding blocks 5 are divided at the position S1 immediately before the upstream of the sorting point S2 into two routes; the straight-ahead path R1 in the state being engaged with the left side, or the sorting path R2 by being pushed to the right, the articles can be positively sorted without any problem.

The actuating device 10 is high in speed in response to the action since engagement of the engaging portion 601 of the engaging strip 8 can be released with a small distance of movement, and thus the sliding blocks 5 mounted on each bearing surface defining member 2 may be selectively operated even when the sort conveyor 1 is traveled at high velocity. Therefore, it is suitable for the high speed sort conveyor for the small sized articles in which the mounting interval of the bearing surface defining members 5 in the direction of travel of the conveyor and the number of the sliding blocks 5 for a unit length.

In addition, since the engaging strip 6 may be released from engaged state by a slight motion by leverage between the engaging portion 601 and the touch portion 602 about the pivot pin 7, there is an advantage in that the solenoid or the like that can high in speed of response as an actuating device 10.

INDUSTRIAL APPLICABILITY

According to the present invention, since a sort conveyor that can sort a wide range of articles from caramel boxes or cigarette boxes containing 20 pieces of cigarettes respectively as small articles to cartons or plastic containers providing 20 kg of capacity with the same mechanism, and there is no movable portion such as switch rail or the like for dividing the direction of the sliding blocks at the sorting point, and there is no need to provide the straight-ahead guide rail or the like for limiting the travel in the straight-ahead path of the sliding block, the structure of the conveyor is simplified in which the troubles such as a collision or overrun of the guide pin or the guide roller of the sliding block do not occur, whereby the stable transport and sort can be carried out and the following effects are produced.

The actuating device provided in the upstream of the-sorting point allows the sliding blocks in the area on which the articles not to be sorted are placed to pass through the straight-ahead passage without any contact, and when the sliding blocks of the area on which the articles to be sorted is placed arrives, it is actuated to move the sliding blocks sideways from the side of the straight-ahead path to the side of the sorting path in advance. When moving sideways, the sliding blocks move smoothly since there is no obstacle around the guide pin or the guide roller on the sliding block.

Since only the sliding blocks moved sideways to the side of the sorting path travel at that position and move sideways in the sorting direction by being guided from the sorting point by the sorting guide rail to deliver the articles to the diverging conveyor, the sliding blocks and articles are not subjected to impact and thus transported and sorted very smoothly.

Since plurality of bearing surface defining members are mounted to a pair of left and right mounting members even when the conveyor chain is large, the distance (mounting pitch) between the sliding blocks in the direction of travel may be shortened irrespective of the size of the chain, whereby the articles can be sorted at short intervals shorter than the linking pitch of the chain even by a long conveyer with large chains. The sliding blocks corresponding to the length from the leading edge to the trailing edge of the article to be sorted may be actuated.

In addition, the sliding blocks to be used for sorting articles can carry out the sorting operation without providing excessive intervals (spaces) in front of and behind the article to be sorted since the speed of response of the sliding block to move sideways to the side of the sorting path resiliently (instantaneously) is high. In other words, since the articles are positively sorted even when they are transported and supplied randomly, not at constant intervals, it is not necessary to provide a timing supplying apparatus or the like at a previous process step or the entrance for controlling the intervals to supply the articles, thereby producing economical effects such that the structure is simplified and occurrence of troubles or failures can be prevented.

Since the sliding blocks move sideways to the sorting path instantaneously at high speed when the actuating device releases engagement of the sliding block, they can response satisfactorily even when the transporting speed of the sort conveyor is increased, whereby the capacity can be increased.

Since the engaging strip to be actuated by the actuating device or the pusher means for pushing the sliding block are provided on the side of the mounting member fixed on the chain, reliability in stable operation can be increased.

Since the actuating device for releasing the engaging means is provided outside of the sorting conveyor frame in the upstream of the sorting point, adjustment of delicate timing between sorting action instruction signals for actuating the actuating device and the sliding blocks to be released on the traveling conveyor, and visual inspection of the time lag generated by the elongation of the chain after long period of use from out side can be carried out so that transport and sort can be carried out always in the best condition, and troubles can be prevented.

What is claimed is:

1. A transport-sort conveyor comprising:

a conveyor having conveyor chains travelling and turning endlessly on chain rails provided in parallel on both sides respectively;

a plurality of bearing surface defining members mounted on said conveyor chain on the ends and arranged in parallel;

a sliding block provided on each bearing surface defining member so as to move along a direction parallel to said member and provided with a pin projecting downward;

a sorting guide rail extending in a sorting direction at a sorting point of the conveyor;

engaging means including a engaging strip and a holding portion on a part of the mounting member for mounting said bearing surface defining member to said conveyor chain and to a part of the sliding block respectively so that the sliding block travels while being engaged with one side of the conveyor;

pusher means for urging said sliding block sideways in the sorting direction by a resilient member provided on either one of said mounting member or said sliding block;

an actuating device for releasing engagement between said engaging strip and a holding portion immediately before an upstream side of the sorting point, wherein said sliding block is urged by said pusher means in the sorting direction and moved sideways when engagement between said engaging strip and a holding portion is released by said actuating device for allowing said guide pin projecting downward to travel toward the sorting path so that the sliding block is guided by the sorting guide rail provided from the sorting point in the sorting direction and moved sideways toward a discharging path.

2. A transport-sort conveyor as set forth in claim 1, wherein a plurality of bearing surface defining members are provided on a pair of left and right mounting members, a sliding block is mounted on each bearing surface defining member so as to move freely sideways, and a plurality of pusher means and engaging means are provided on the mounting member corresponding to each sliding block.

3. A transport-sort conveyer as set forth in claim 2, further comprising an upper roller and a lower roller rotating while clamping the upper surface and the lower surface of the bearing surface defining member so that said sliding block moves smoothly in lateral direction by rotation of said rollers.

4. A transport-sort conveyer as set forth in claim 3, wherein the engaging strip is provided on the mounting member, and the holding member is provided on the sliding block.

5. A transport-sort conveyer as set forth in claim 3, wherein a pusher for urging said sliding block toward the sorting path is provided on a part of said mounting member.

6. A transport-sort conveyer as set forth in claim 2, wherein the engaging strip is provided on the mounting member, and the holding member is provided on the sliding block.

7. A transport-sort conveyer as set forth in claim 2, wherein a pusher for urging said sliding block toward the sorting path is provided on a part of said mounting member.

8. A transport-sort conveyor as set forth in claim 1, further comprising an upper roller and a lower roller rotating while clamping the upper surface and the lower surface of the bearing surface defining member so that said sliding block moves smoothly in lateral direction by rotation of said rollers.

9. A transport-sort conveyer as set forth in claim 8, wherein the engaging strip is provided on the mounting member, and the holding member is provided on the sliding block.

10. A transport-sort conveyer as set forth in claim 8, wherein a pusher for urging said sliding block toward the sorting path is provided on a part of said mounting member.

11. A transport-sort conveyor as set forth in claim 1, wherein the engaging strip is provided on the mounting member, and the holding member is provided on the sliding block.

12. A transport-sort conveyer as set forth in claim 11, wherein a pusher for urging said sliding block toward the sorting path is provided on a part of said mounting member.

13. A transport-sort conveyor as set forth in claim 1, wherein said pusher means comprises a pusher for urging said sliding block toward the sorting path is provided on a part of said mounting member.

* * * * *